United States Patent [19]

Kohno et al.

[11] Patent Number: 4,963,721

[45] Date of Patent: Oct. 16, 1990

[54] ROTATABLE BAR CODE READER ARRANGEMENT FOR A CHECK OUT SYSTEM

[75] Inventors: Mitsunori Kohno; Takao Umebara; Yukuo Kurimoto; Nobuhiko Fujii; Hiromasa Akita, all of Shizuoka, Japan

[73] Assignee: Tokyo Electric Company, Ltd., Tokyo, Japan

[21] Appl. No.: 247,688

[22] Filed: Sep. 22, 1988

[30] Foreign Application Priority Data

| Sep. 22, 1987 | [JP] | Japan | 62-144898[U] |
|---|---|---|---|
| Jul. 12, 1988 | [JP] | Japan | 63-092009[U] |
| Jul. 12, 1988 | [JP] | Japan | 63-172895 |
| Jul. 12, 1988 | [JP] | Japan | 63-172896 |
| Jul. 12, 1988 | [JP] | Japan* | 63-172897 |
| Jul. 12, 1988 | [JP] | Japan | 63-172898 |
| Jul. 12, 1988 | [JP] | Japan | 63-172899 |

[51] Int. Cl.⁵ .................. G06K 7/10; G06K 9/18
[52] U.S. Cl. ................................ 235/462; 186/61; 235/439
[58] Field of Search .............. 235/315, 383, 385, 439, 235/462, 472, 482; 364/405; 186/59, 60, 61, 62

[56] References Cited

U.S. PATENT DOCUMENTS

| 2,964,134 | 12/1960 | Bisen | 186/59 |
|---|---|---|---|
| 3,557,907 | 1/1971 | Close | 186/62 |
| 4,618,032 | 10/1986 | Woolf | 186/61 |
| 4,652,732 | 3/1987 | Nickl | 235/462 |
| 4,672,184 | 6/1987 | Fujiwara et al. | 235/462 |
| 4,787,467 | 11/1988 | Johnson | 235/383 |
| 4,788,420 | 11/1988 | Chang et al. | 235/482 |
| 4,789,048 | 12/1988 | Cramer et al. | 186/61 |
| 4,838,383 | 6/1989 | Saito et al. | 186/59 |

FOREIGN PATENT DOCUMENTS

| 0036781 | 9/1981 | European Pat. Off. . | |
|---|---|---|---|
| 0196192 | 10/1986 | European Pat. Off. . | |
| 2218846 | 10/1973 | Fed. Rep. of Germany . | |
| 59-208671 | 11/1984 | Japan | 235/383 |
| 62-54531 | 1/1987 | Japan . | |

*Primary Examiner*—Stuart S. Levy
*Assistant Examiner*—Robert A. Weinhardt
*Attorney, Agent, or Firm*—Oblon, Spivak, McClelland, Maier & Neustadt

[57] ABSTRACT

An apparatus for reading commodity data is disclosed which comprises a support member, a reader formed of a reader body and a reading window provided on one face of the reader body, in which the reader is attached to the support member for rotation. The attitude of the reaading window can thus be adjusted according to the stature of the operator enabling the operator to perform a tireless reading operation. The attitude of a display has also been made adjustable.

13 Claims, 12 Drawing Sheets

ROTATABLE BAR CODE READER ARRANGEMENT FOR A CHECK OUT SYSTEM

FIELD OF THE INVENTION AND RELATED ART STATEMENT

The present invention relates to apparatus for reading commodity data forming a checkout system for use in retail stores and the like.

So far, an apparatus for reading commodity data as shown in FIG. 13 has been in use which includes a stationary reader 15 formed of a reader body 13 and a reading window 14 provided on the front face thereof installed on a laterally elongated counter 16 and is adapted such that commodity data in the form of bar code or the like are read by the reader 15 while each commodity is moved past the front face of the reading window 14 from one side of the counter 16 to the other side.

In handling a commodity to read its data, it is preferable that the commodity data is held in confronted relation with the reading window 14. However, since the reader 15 is fixed and hence the height and orientation of the reading window 14 is fixed, the operator has to change, according to the stature of the operator, the angle of the arm holding the commodity to bring the commodity data face to face with the reading window 14. Besides, since the face of the commodity data in confrontation with the reading window 14 is turned forward held in vertical direction, the position on the reading window 14 toward which the commodity data is directed is difficult to observe. If the angle of the bent arm is large, it means that the operator is lifting the commodity up and hence being required to expend correspondingly heavy labor.

Further, since the position of the display is fixed, the operator in handling the commodities must turn the eyes hither and thither causing the eyes to be easily strained.

Besides, since the bar code reader, the display, and the like are attached to a frame, when it is transported to the position of use, it is possible that the bar code reader or the display is injured by interfering with other furniture or the like.

OBJECT AND SUMMARY OF THE INVENTION

A first object of the present invention is to provide a commodity data reading apparatus which an operator can operate in an easy posture according to the stature of the operator.

A second object of the present invention is to provide a commodity data reading apparatus in which the position of the display can be adjusted according to the stature of the operator so that it imposed less strain on the eyes.

A third object of the present invention is to provide a mechanism in a simple structure for changing the orientation of the reading surface of the bar code reader.

A fourth object of the present invention is to provide a commodity data reading apparatus in which the orientation of the bar code reader and the inclination of the keyboard can be adjusted separately.

A fifth object of the present invention is to provide a commodity data reading apparatus provided with means for protecting the bar code reader and the display.

DETAILED DESCRIPTION OF THE PREFERRED EMBODIMENTS

Figure 1:
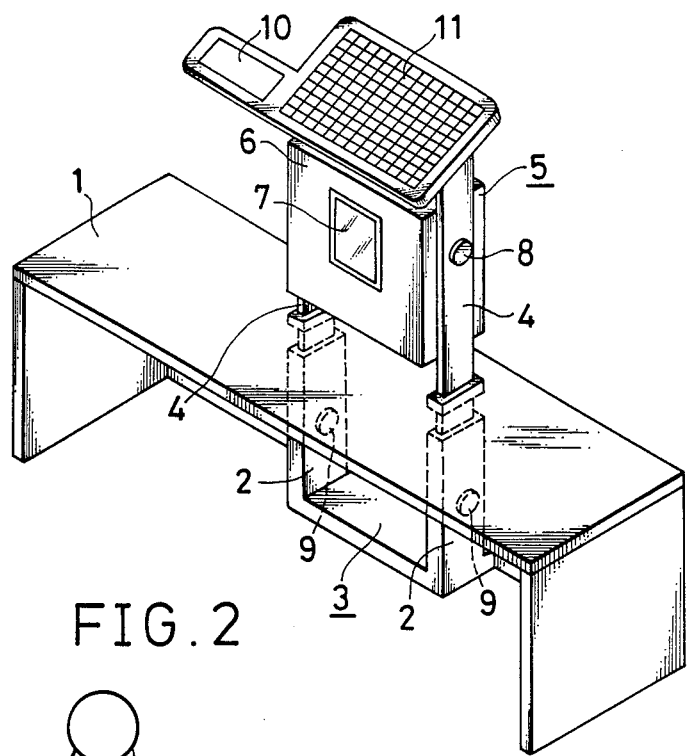
FIG. 1 is a perspective view showing a first embodiment of the present invention.
Figure 2:
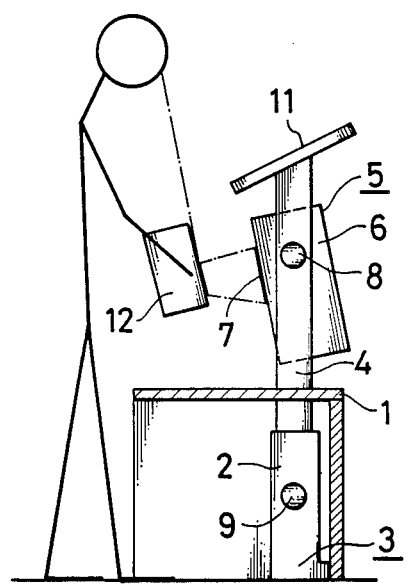
FIG. 2 is a partly sectional side view of the first embodiment.

A first embodiment of the present invention will be described with reference to FIG. 1 and FIG. 2. Reference numeral 1 denotes a counter, and a support member 3 having rectangular pipings 2 opposing each other is fixed to the lower portion of the counter 1. There are a pair of elevating members 4, on the left and right, fitted in the rectangular pipings 2 for sliding in the vertical direction. Reference numeral 5 denotes a bar code reader, and its reader body 6 is provided with a reading window 7 formed on the front face thereof. On the outer surface of the reader body 6 and on the inner surface of the elevating member 4, there are formed bosses (not shown) which are fitted to each other for rotation around an axis running from side to side. There is a fastening screw 8 serving to fix the reader in place passed through the elevating member 4 in alignment with the axis of the bosses and the end of the fastening screw 8 is threaded in the reader body 6. There also is a fastening screw 9 serving to fix the elevating member in place threaded in the rectangular piping 2, and there are a plurality of recesses (not shown) with which the end of the fastening screw 9 engages made in the side face of the elevating member 4 at regular intervals in the vertical direction. To the tops of the elevating members 4, a keyboard 11 having a display portion 10 is attached.

In the described arrangement, a basket (not shown) containing commodities 12 is mounted on the counter 1 at its right-hand side, whereas an empty basket is placed at the left-hand side. The commodity data of the commodities 12 in the form of bar code or the like are read by the bar code reader 5 while each commodity 12 is picked out from the basket on the right and put into the basket on the left past the front surface of the reading window 7.

Prior to the reading operation, the fastening screws 9 are unscrewed to allow the elevating members 4 to slide up or down together with the bar code reader 5 and thereafter the fastening screws 9 are tightened to fix the elevating members 4, whereby the bar code reader 5 is adjusted to the stature of the operator. Also, the fastening screws 8 are unscrewed to allow the reader body 6 to turn backward or forward and thereafter the fastening screws 8 are tightened to fix the reader body 6, whereby the orientation of the bar code reader 5 is adjusted so that, when the commodity data is held somewhat to look up, the surface having this commodity data thereon comes face to face, in parallel, with the reading window 7. Hence, even when operators are changed, the apparatus can be adjusted so that, when a commodity 12 is held to face the reading window 7, the angle of the bent arms of the new operator may be suitable to the operator and the facing condition of the commodity data with the reading window 7 may be easily observed. Thus, the labor required for the reading operation can be lessened and reading errors reduced.

When a commodity 12 has no commodity data provided thereon, the keyboard 11 is used for inputting the pertinent data.

Figure 3:
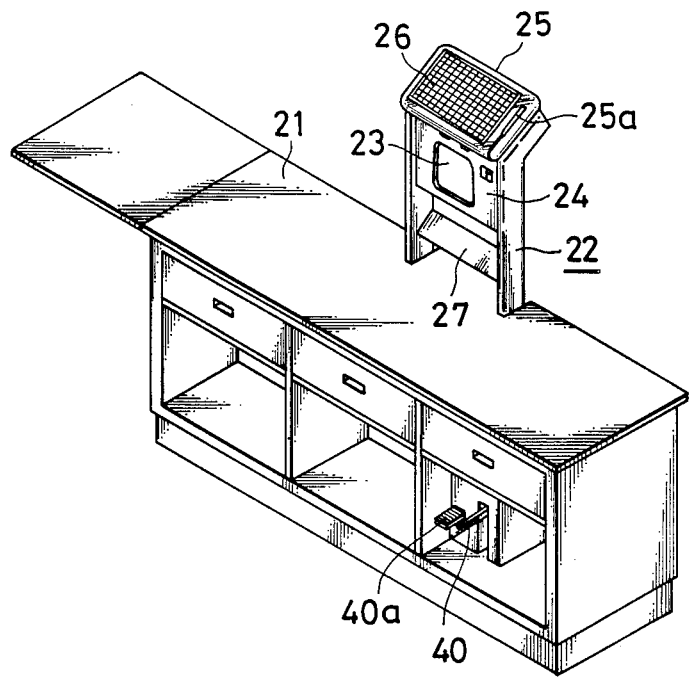
FIG. 3 is a reduced perspective view showing an overall arrangement of a second embodiment of the present invention.

A second embodiment of the present invention will be described below with reference to FIG. 3 to FIG. 11. As shown in FIG. 3, a frame 22 is provided in the center of a sacker table 21, and a bar code reader 24 with a reading window 23 formed on the front surface thereof, a keyboard 26 for inputting commodity data, and a display for cashier 27 are mounted to the frame 22. On the body case 25 of the keyboard 26, there is provided a card inserting portion 25a for inserting a magnetic card therein integrally formed with the body case, and a magnetic card reading portion (not shown) for reading magnetic data from the magnetic card is disposed below the card inserting portion 25a incorporated in the body case.

Figure 10:
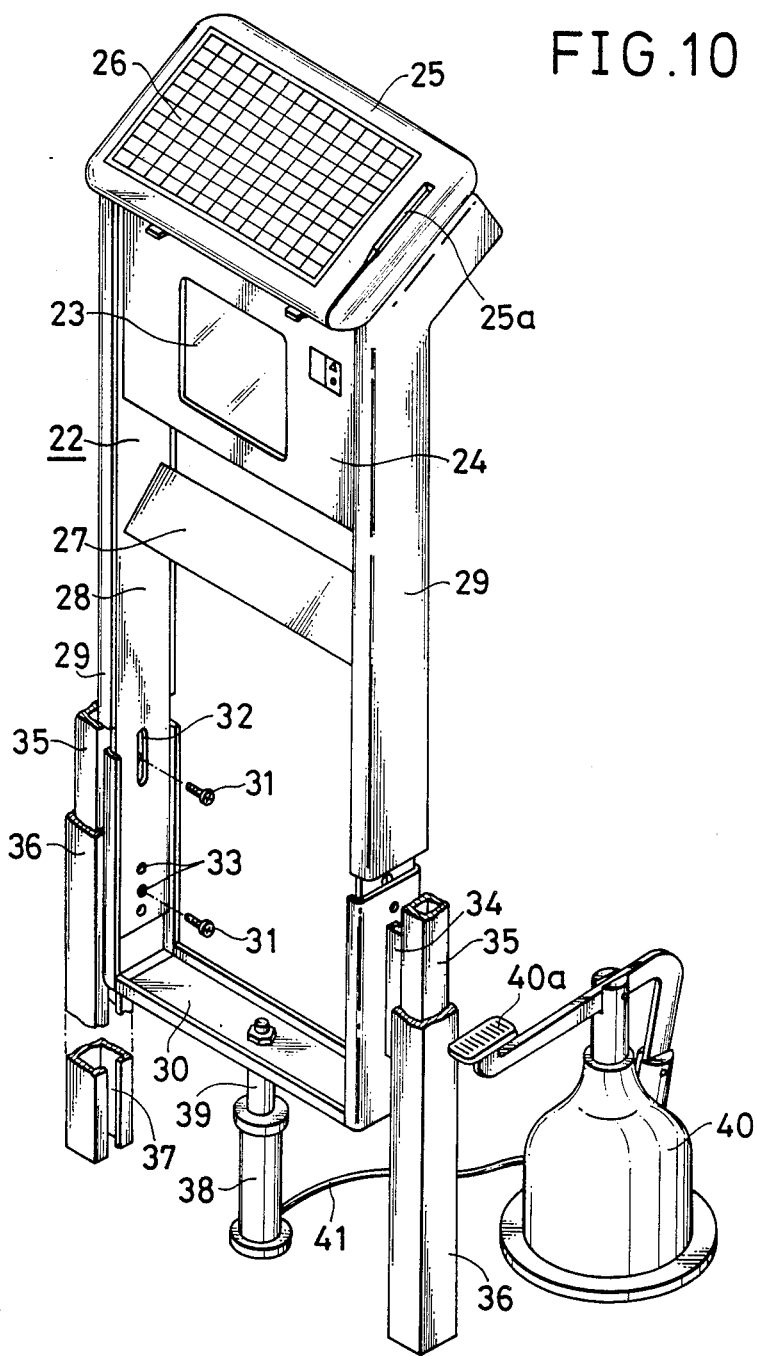
FIG. 10 is a perspective view showing a coupling mechanism between a frame and an oil cylinder.

The frame 22 is formed, as shown in FIG. 10, of a pair of pillars 28 on the left and the right, pillar covers 29 covering outer sides of these pillars from the center to the top, and a U-formed connecting frame 30 for connecting lower portions of the pillars 28, for expansion. That is, each of the pillars 28 is provided with a longitudinally slotted hole 32 and a plurality of set holes 33 made therein arranged in the vertical direction for inserting set screws 31 therein to be threaded into screw holes (not shown) made in the inner side of the connecting frame 30. Thus, by selecting one of the set holes 33 for inserting the set screw 31, the length of the frame 22 can be adjusted. Further, to each of the outer sides of the connecting frames 30, a vertically extending strip of projection 34 is fixed. To each strip of projection 34 is fixed a rectangular piping 35, which is guided for vertical movement by each of guide members 36 fixedly erected on the floor. The inner side of each of the guide members 36 is provided with a vertically extending groove made therein for allowing the strip of projection 34 to escape. The lower portion of the frame 22 is fixed to a piston 39 of an oil cylinder 38 fixed to the floor and the oil cylinder 38 and an oil jack 40 is connected by a pipe 41.

Figure 4:
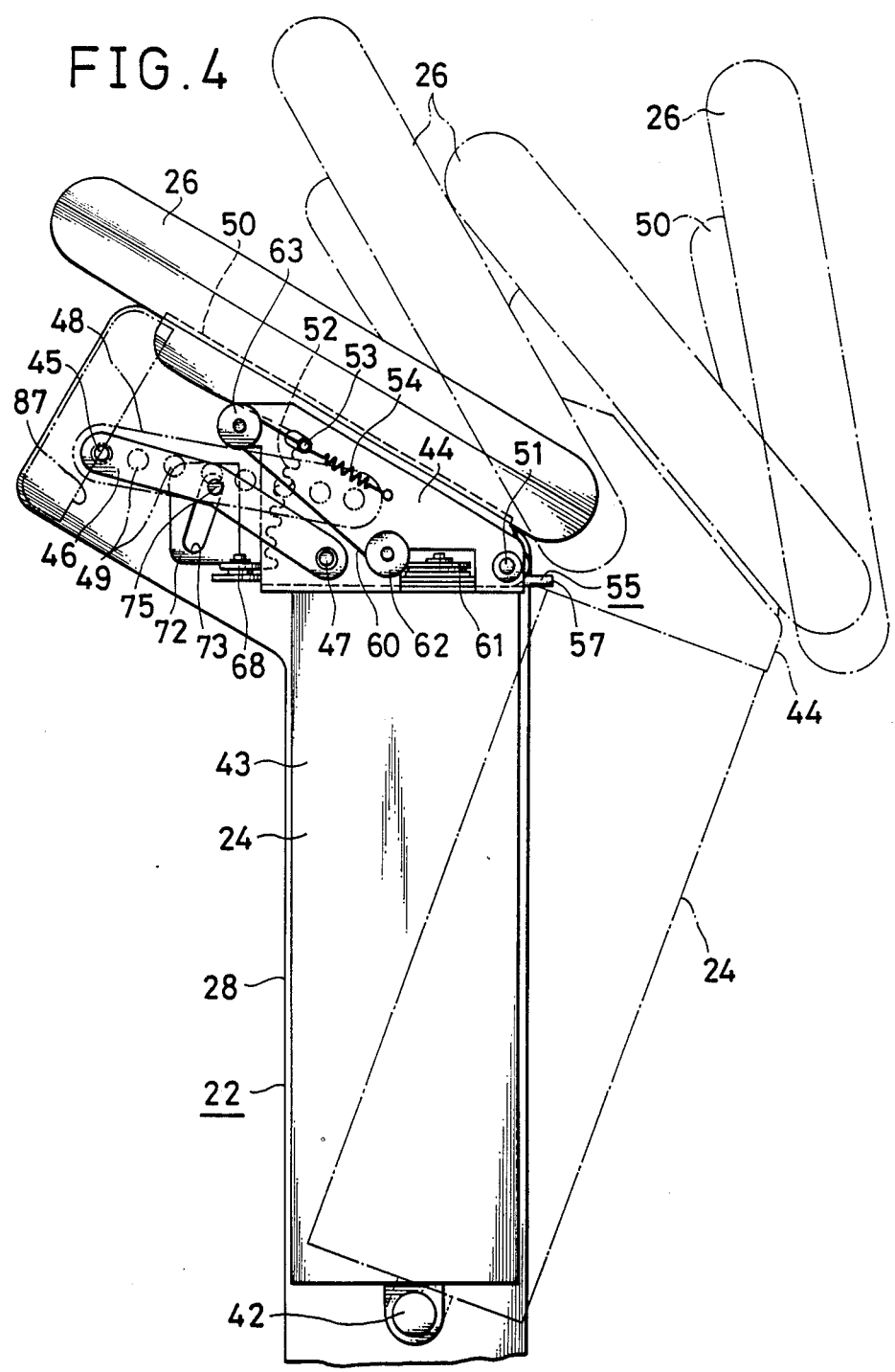
FIG. 4 is a left-hand side view with a left pillar removed for showing a support structure of the bar code reader and the keyboard.
Figure 5:
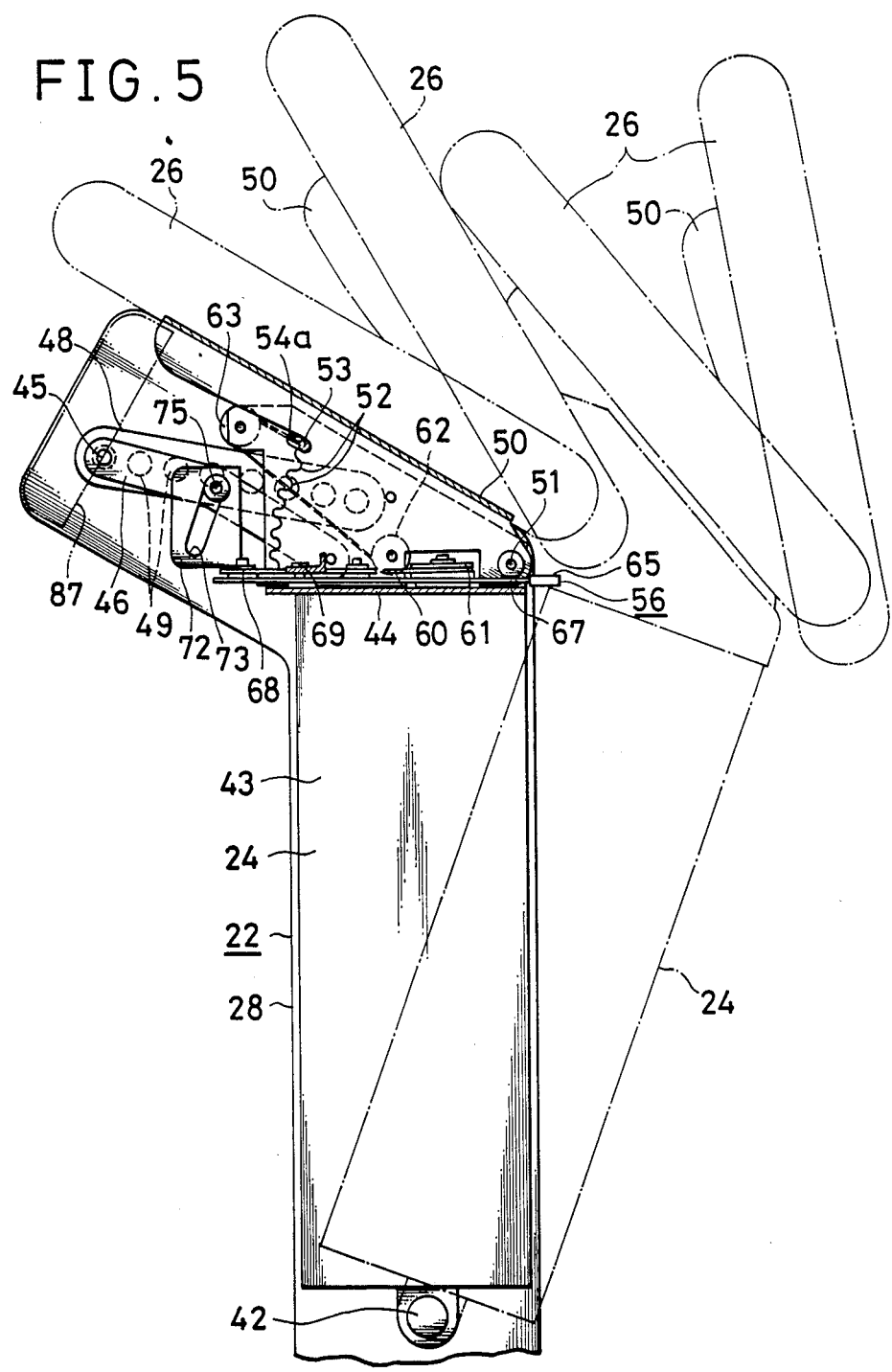
FIG. 5 is a left-hand side view in section of the same portion.
Figure 11:
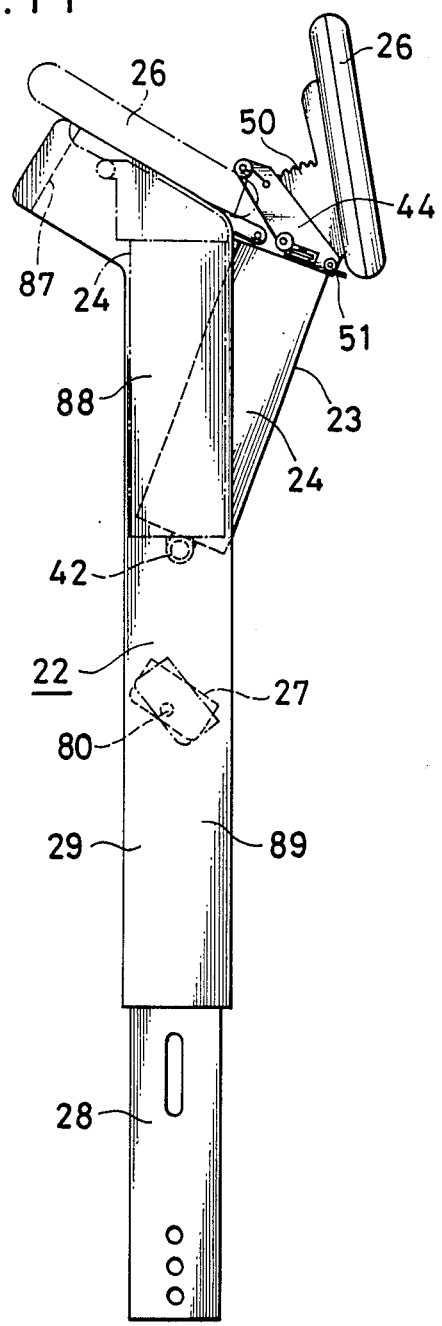
FIG. 11 is a left-hand side view.

A supporting mechanism of the bar code reader 24 and the keyboard 26 will now be described with reference to FIG. 4, FIG. 5, and FIG. 11. FIG. 11 is a left-hand side view, FIG. 4 is a left-hand side view with one pillar 28 of the frame 22 cut away, and FIG. 5 is a left-hand side view in vertical section, wherein the pillar 28 supports the bar code reader 24 with its lower portion held by a support shaft 42 for rotation around it. Thereby, the bar code reader 24 can be rotated from the upright position in parallel with the pillar 28 to the right (toward the cashier). On the top of the housing 43 of the bar code reader 24, there is provided a metallic mount 44, fixed to the housing by screws, with a cross section in the shape of the letter U being erect. On both outer sides of the mount 44, there are provided stop levers 46 with their base portions held by each of support shafts 47 for rotation around it. Each stop lever 46 has a pin 45 projecting outwardly from the outer side of its swinging free end. The pin 45 is guided in the rotating direction of the bar code reader 24 by a guide member 48 fixed to the inner side of the pillar 28. The guide member 48 is provided with a plurality of engagement holes 49 for engagement with the pin 45 arranged along its length. Here, the stop lever 46 is formed of a resilient material and it can therefore be resiliently bent in the direction of its thickness.

Figure 7:
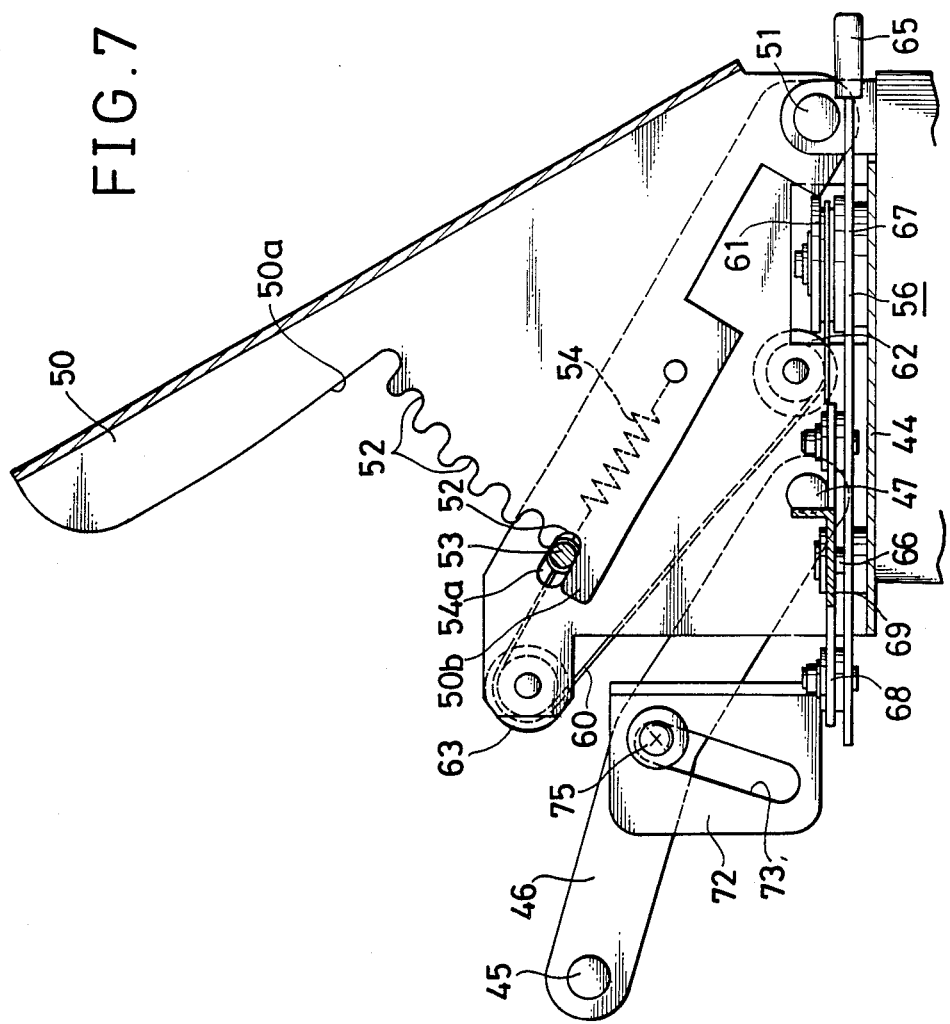
FIG. 7 is a left-hand side view in vertical section showing in an enlarged scale a rotating and supporting mechanism for the base of the keyboard.

The keyboard 26 has a metallic base on its underside. This base 50 has a cross section in the shape of the letter U being inverted. Both sides of the base 50 are coupled with both sides of the mount 44 by means of support shafts 51 for rotation up and down around the same. These support shafts 51 are located closer to the cashier (to the right in FIG. 4, FIG. 5, and FIG. 11). Both sides of the base 50 are provided with engagement portions 52 in a sawtooth form along an arc of a circle with the center of the support shaft 51 taken as the center of the circle, and engagement members 53 in a pin form to be engaged with any of the engagement portions 52 are retained in slotted holes 54a made in both sides of the mount 44. The slotted hole 54a, as shown in FIG. 5 and FIG. 7, is formed in the direction to allow the engagement member 53 to retreat from and advance to the engagement portion 52. The engagement member 53 is urged by a spring 54 one end thereof being fixed to the outer side of the mount 44, whereby the same is resiliently engaged with one of the engagement portions 52.

Figure 6:
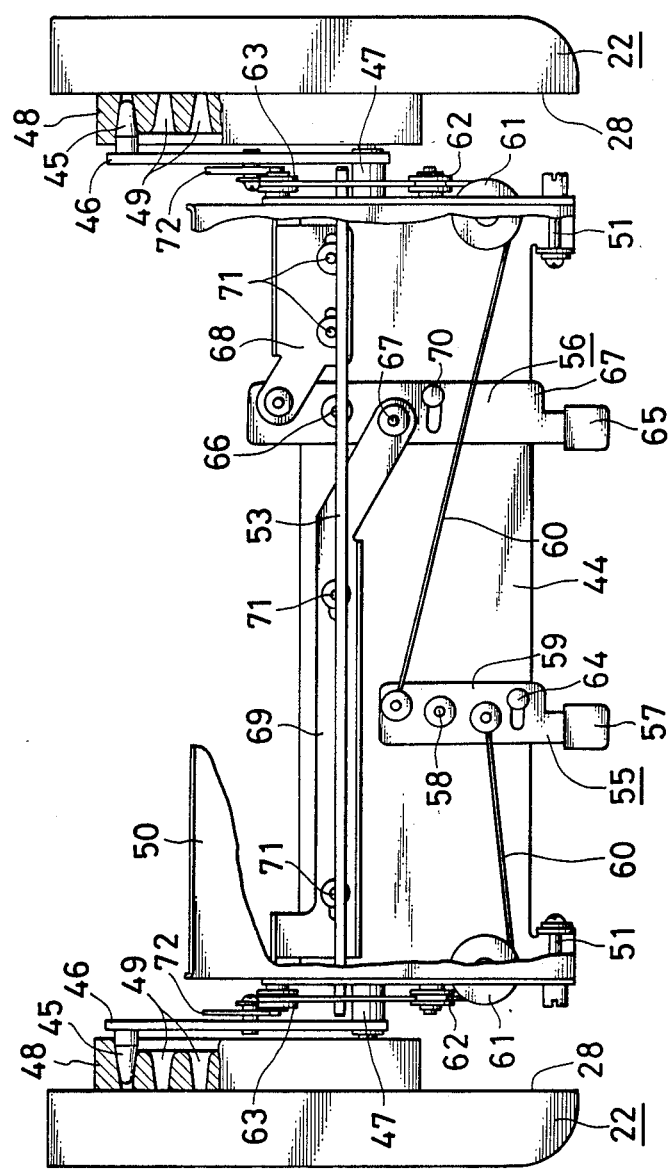
FIG. 6 is a partially cutaway plan view showing an operating mechanism on a mount.
Figure 8:
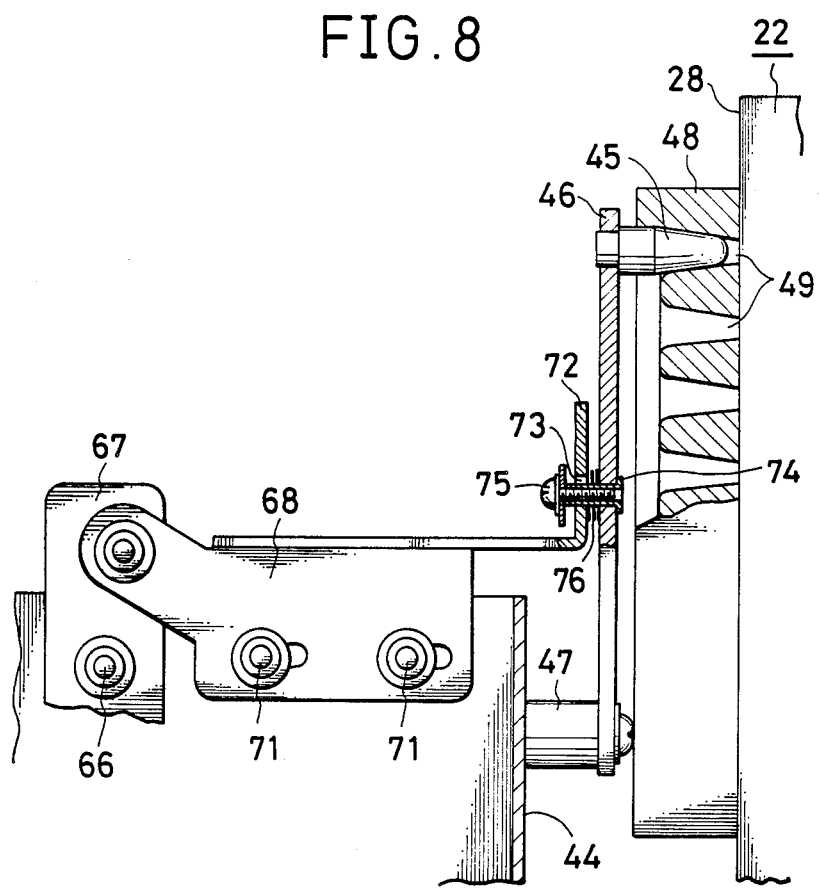
FIG. 8 is a partially cutaway plan view showing a coupling mechanism between a stop lever and sliding bars.

Now, structure of an operating mechanism to cause the engagement member 53 to retreat from the engagement portion 52 and an operating mechanism to cause the pin 45 of the stop lever 46 to retreat from the engagement hole 49 will be described with reference to FIG. 4 to FIG. 6. FIG. 6 is a plan view with upper side of the base 50 cut away, wherein reference numeral 55 denotes the operating mechanism to cause the engagement member 53 to retreat from the engagement portion 52 and reference numeral 56 denotes the operating mechanism to cause the pin 45 of the stop lever 46 to retreat from the engagement hole 49. One operating mechanism 55 is formed of a lever 59 having a grip 57 projecting toward the cashier and being held to the bottom side of the mount 44 for rotation around a support shaft 58 and wires 60 one ends thereof being fixed to positions separated from the support shaft 58 and the other ends being fixed to the pin-formed engagement members 53. The path along which each wire 60 runs is defined by pulleys 61, 62, 63 rotatably fitted to the bottom side and the outer side of the mount 44. While the lever 59 is biased in an clockwise direction by tension of the wire 60 resulting from the pull of the spring 54, its range of rotation in the clockwise direction is limited by a stopper pin 64 vertically embedded in the bottom plate of the mount 44. The other operating mechanism 56 is formed of a lever 67 having a grip 65 projecting toward the cashier and being held to the bottom side of the mount 44 for rotation around a support shaft 66 and sliding bars 68, 69 one ends thereof being fixed to positions separated from the support shaft 66 for rotation around these and the other ends being coupled with the stop levers 46. A stopper pin 70 for limiting the range of rotation of the lever 67 in a clockwise direction and guide pins 71 for guiding movements of the sliding bars 68, 69 are vertically embedded in the bottom plate of the mount 44. The ends of the sliding bars 68, 69 are sticking out of both the outer sides of the mount 44. At each of the ends, there is provided, attached thereto and along the stop lever 46, a flexible piece 72 with a vertically slotted hole 73 made therein as shown in FIG. 4 and FIG. 5. Into the slotted hole 73 is inserted a screwed pipe 74 vertically embedded in the middle portion of the stop lever 46. By screwing a screw 75 from inner side of the flexible piece 72 into the screw pipe 74 as shown in FIG. 8, the flexible piece 72 of the sliding bar 68, 69 and the stop lever 46 are coupled. Between the flexible piece 72 and the stop lever 46, there is provided a compression spring 76 fitted on the screw pipe 74.

Incidentally, while the range of rotation of the lever 59 is limited by the stopper pin 64 as described above, this range of rotation of the lever 59 is so designed that, even if the lever 59 is moved in a counterclockwise direction to the limit of the range of rotation to thereby pull the wire 60, the engagement member 53 is still caught slightly by the opening of the engagment portion 52. In this case, however, the slotted hole 54a has a margin in its length so that the engagement member 53 may separate further from the engagement portion 52.

Figure 9:
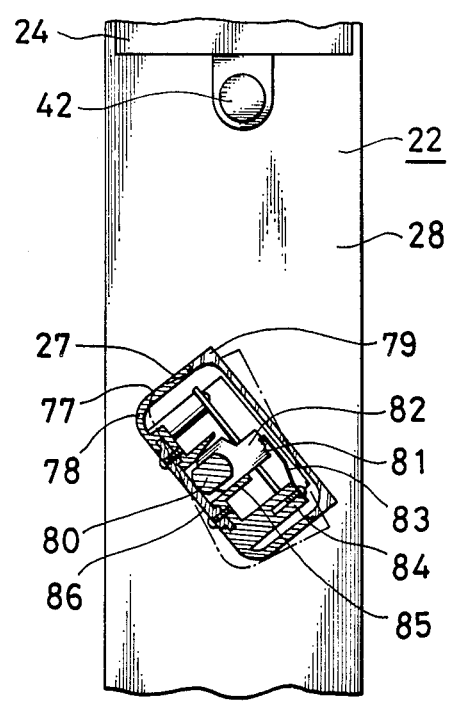
FIG. 9 is a left-hand side view in vertical section for showing a rotating and supporting mechanism of the display.

The mechanism for holding the display 27 in the pillars 28 is shown in FIG. 9. FIG. 9 is a vertical sectional view showing lower portion of the frame 22, wherein an outer case 77 of the display 27 is formed by coupling a case 78 and a light-transmitting cover 79 with the faces of their openings joined together. Through the outer case 77 is passed a special form shaft 80 fixedly attached to both the pillars 28. Both ends of the special form shaft 80 are provided with plate cams 82 fixedly fitted thereon, each cam having a plurality of engagement portions 81 in a saw tooth form provided along an arc of a circle with the center of the special form shaft 80 taken as its center. And, engagement pieces 83 resiliently engaging with any of the engagement portions 81 are fixed by screws to bosses 84 vertically embedded in the case 78. On both sides of the case 78, there are provided engagement portions 85 in a slit form to engage with the cam 82. Inner walls of both sides of these engagement portions 85 are adapted to come in abutment with both sides of the cam 82, whereby the movement of the outer case 77 along the axis of the special form shaft 80 is restricted. And, the edge of the cam 82 in the direction around the special form shaft 80 is confronting the inner wall of the engagement portion 85 with a predetermined amount of play, and thereby, the range of rotation of the outer case 77 with respect to the special form shaft 80 is virtually set to 15 degrees. Further, the bottom side of the case 78 is hollowed for passing the special form shaft 80 and the cam 82 therethrough, but there is provided a bottom cover 86 on the bottom side fixed by screws. The above described display 27 is that for the cashier. The display 87 for customers is provided mounted on the tops of the pillars 28 as shown in FIG. 4, FIG. 5, and FIG. 11.

The depth of the frame 22 at its upper portion is made to be larger than the depth of the bar code reader 24 when it is held upright. That is, on both sides of the upper portions of the frames 22, there are provided, as shown in FIG. 11, covering portions 88 which when viewed sideways will cover the side faces of the bar code reader 24 in an upright position. Further, the depth of the frame 22 at the intermediate height is arranged to be larger than the diagonal length of the side face of the display 27 for cashier. That is, at both sides of the frame 22 at the intermediate height, there are provided covering portions 89 which when viewed sideways will cover the display 27 in its any rotated position.

With described arrangement, by means of the engagement member 53 urged by the spring 54 put in engagement with certain engagement portions 52 on the base 50 of the keyboard 26, the rotational movement of the keyboard 26 around the support shaft 51 is stopped, whereby the keyboard 26 is maintained in a stabilized state at a specific position. Then, by turning the lever 59 counterclockwise with the use of the grip 57 projecting toward the cashier from below the front edge of the keyboard 26, the wires 60 are pulled, whereby the engagement members 53 retreat from the engagement portions 52 against the force of the springs 54. Thus, it becomes possible to incline the keyboard 26 around the support shaft 51 at a desired angle. During the adjustment of the angle of inclination of the keyboard 26, the range of rotation of the lever 59 is limited by the stopper pin 64, and thereby, the engagement members 53 are held to be still engaged slightly with the engagement portions 52. Hence, the keyboard 26 is prevented from falling by its own weight through an oversight. Under such conditions, by rotating the base 50 together with the keyboard 26, the component force of the rotating force acting on the keyboard 26 causes the engagement members 53 to retreat from the engagement portions 52 thereby allowing the rotation of the base 50. Further, by providing, as shown in FIG. 7, each side of the base 50 with a stopper 50a positioned above the topmost engagement portion 52 and a stopper 50b positioned below the bottommost engagement portion 52 so that the engagement member 53 is stopped by these stoppers 50a, 50b, the range of rotation of the keyboard 26 with respect to the mount 44 is limited.

Further, since the pins 45 of the stop levers 46 at both sides of the mount 44 are engaged with certain engagement holes 49 of the guide members 48, the bar code reader 24 is prevented from rotational movement around the support shaft 42 and maintained in a stabilized state at a specific position. Then, by turning the lever 67 counterclockwise with the use of the grip 65, the sliding bars 68, 69 are pulled inward and these sliding bars 68, 69 pull the stop levers 46 inward, whereby the stop lever 46 is bent inward causing the pins 45 to be disengaged from the engagement holes 49. Thus, the bar code reader 24 can be turned around the support shaft 42 from the state held upright in parallel with the pillar 28 to a state facing downward obliquely. If then the hand is taken off the lever 67, the stop levers 46 return outward to original positions by their own elasticity pulling the sliding bars 68, 69 and thereby cause each of the pins 45 to engage with certain engagement holes 49 of the guide member 48.

And, since the front end of each of the engagement pieces 83 resiliently engages with one of the engagement portions 81 of the cam 82, the display 27 is maintained in a stabilized state facing upward at a specific angle. By turning the outer case 77 around the special form shaft 80 fixed in place together with the cam 82, its angle of elevation can be adjusted. At this time the engagement piece 83 is changed to another engagement portion 81 to engage therewith.

Further, if a pedal 40a of the oil jack 40 is pressed with the foot appropriately, pressure oil is supplied to the oil cylinder 38 whereby the frame 22 is pushed up by the piston 39, and if the foot is taken off the pedal 40 when the frame 22 has reached a level, it stably remains there. And, if the pedal 40a is pressed to the very end, pressure oil in the oil cylinder 38 is returned to the jack 40 and thereby the frame 22 is lowered. Thus, the bar code reader 24, the keyboard 26, and the displays 27, 87 can be adjusted in height. Besides, since the oil jack 40 is used as the power source for lifting them, the work for adjusting them to the stature of the cashier can be done with lessened labor and great ease.

In registering the commodity data, the cashier can have the bar code attached to a commodity read by the bar code reader 24 during the course the cashier takes out the commodity from a basket placed on the sacker table 21 at one end and puts the commodity into another basket placed at the other end. If no bar code is attached or a bar code is stained, the cashier can input the commodity data by the keyboard 26 looking at the surface of the commodity on which its quality and the like are indicated and then at the keyboard 26.

Further, in transporting the apparatus, the bar code reader 24 is held upright in parallel with the pillars 28 of the frame 22. In this state, the bar code reader 24 does not project from the front edge and the back edge of the covering portions 88 of the frame 22, and hence it does not interfere with other furniture or the like. And, since the display does not project from the front edge and the back edge of the covering portions 89 of the frame 22 regardless of its rotated position, it does not interfere with other furniture or the like.

Figure 12:
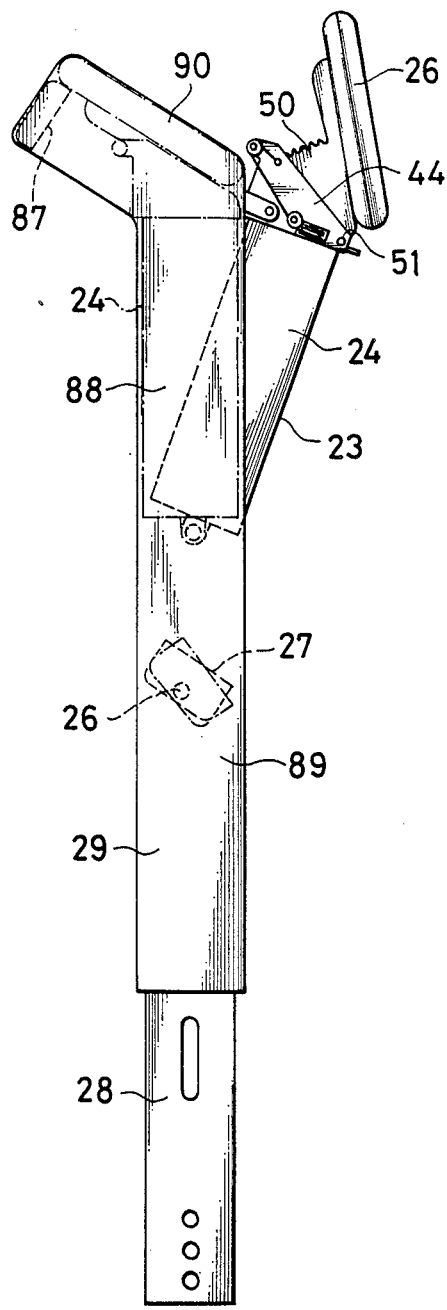
FIG. 12 is a left-hand side view showing a third embodiment of the present invention.
Figure 13:
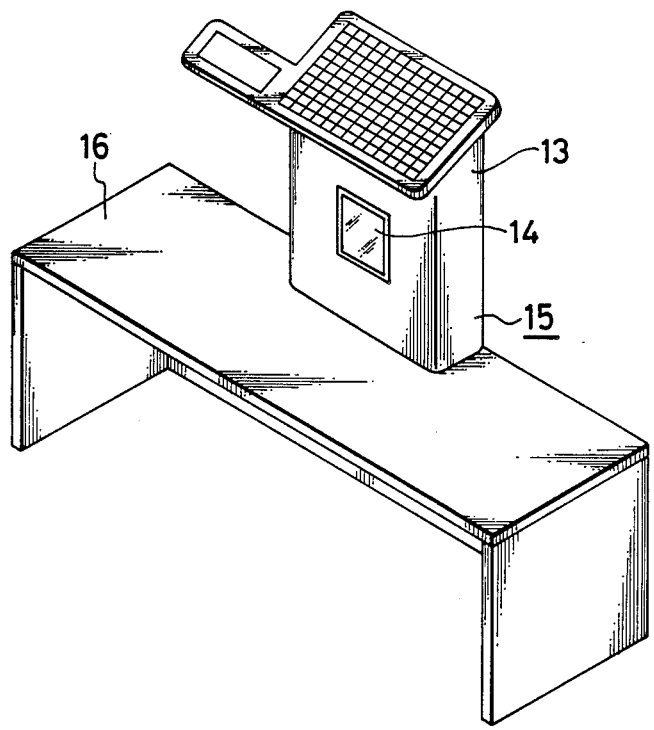
FIG. 13 is a perspective view showing a prior art example.

A third embodiment of the present invention will be described with reference to FIG. 12, wherein corresponding parts to those in the above described embodiments are denoted by corresponding reference numerals and explanation thereof will be omitted. The present embodiment is arranged such that, when the bar code reader 24 is returned to its upright position and the keyboard 26 is held in the position the angle of elevation thereof is brought to a minimum, covering portions 90 which will cover both sides of the keyboard 26 when viewed sideways are provided at the upper end portions of the frames 22. Therefore, in transporting the apparatus, while interference of the bar code reader 24 and the display 27 with other furniture or the like can be prevented by the covering portions 88, 89, interference of the keyboard 26 with other furniture or the like can also be prevented by the provision of the aforesaid covering portions 90.

What is claimed is:

1. A rotatable bar code reader arrangement for a check out system comprising:
   a support frame having sides;
   a bar code reader having an operator side and a customer side respectively connected by side faces, a reading window being disposed on the operator side of the bar code reader;
   attachment means for mounting the bar code reader on the support frame for rotation about a first axis of rotation;
   a keyboard; and
   a display having a display side and a side substantially opposite the display side which are respectively connected by side faces, the support frame being provided on both sides thereof with covering portions for covering the display when viewed sideways.

2. A rotatable bar code reader arrangement according to claim 1, further comprising keyboard attachment means for attaching said keyboard to the bar code reader.

3. A rotatable bar code reader arrangement according to claim 1, further comprising rotatable keyboard attachment means for rotatably attaching the keyboard to the bar code reader for rotation about a second axis of rotation.

4. A rotatable bar code reader arrangement according to claim 3, further comprising keyboard retaining means for fixing an angular position of the keyboard at a given angle of rotation about the second axis of rotation.

5. A rotatable bar code reader arrangement according to claim 4, wherein the keyboard retaining means comprises:
   a mounting member fixed to the bar code reader and forming an interface between the keyboard and mounting member;
   a plurality of engagement portions located along an arc having a center of curvature substantially at the second axis of rotation, the plurality of engagement portions being provided on one side of the interface between the mounting member and the keyboard;
   an engagement member for selectively engaging any of one of the plurality of engagement portions to fix the angular position of the keyboard, the engagement member being provided on a side of the interface between the keyboard and mounting member which is opposite the one side of the interface at which the plurality of engagement portions are provided, and
   an operating mechanism for causing the engagement member to be moved out of engagement with one of the plurality of engagement portions.

6. A rotatable bar code reader arrangement according to claim 5, wherein the operating mechanism is operated by movement of a grip portion adapted to be moved by the operator.

7. A rotatable bar code reader arrangement according to claim 1, further comprising bar code reader retaining means for fixing an angular position of the bar code reader at a given angle of rotation about the first axis of rotation.

8. A rotatable bar code reader arrangement according to claim 7, wherein the bar code reader retaining means comprises:
   a plurality of engagement portions located along an arc having a center of curvature substantially at the first axis of rotation, the plurality of engagement portions being provide on one side of an interface between the support frame and the bar code reader;
   an engagement member for selectively engaging any one of the plurality of engagement portions to fix the angular position of the bar code reader, the engagement member being provide on a side of the interface opposite the side of the interface at which the plurality of engagement portions are provided; and an operating mechanism for causing the engagement member to be moved out of engagement with one of the plurality of engagement portions.

9. A rotatable bar code reader arrangement according to claim 8, wherein the operating mechanism is operated by movement of a grip adapted to be moved by the operator.

10. A rotatable bar code reader arrangement according to claim 1, further comprising display attachment means for rotatably attaching the display to the support frame for rotation about a third axis of rotation.

11. A rotatable bar code reader arrangement according to claim 1, wherein the support frame is provided on both sides thereof with covering portions for covering the side faces of the bar code reader when the bar code reader is held in a substantially upright position.

12. A rotatable bar code reader arrangement according to claim 1, wherein the support frame has a back and the display is fixed on the back of the support frame with the display side facing the customer side of the bar code reader.

13. A rotatable bar code reader arrangement according to claim 1, wherein the keyboard has a body case including a magnetic data reader for reading data from a magnetic card having data magnetically encoded thereon.

* * * * *